Nov. 19, 1968 A. A. SHOSTAK 3,412,371
DETECTION SYSTEM
Filed March 10, 1967

INVENTOR.
Arnold A. Shostak

United States Patent Office 3,412,371
Patented Nov. 19, 1968

3,412,371
DETECTION SYSTEM
Arnold A. Shostak, Arlington, Va., assignor to the United States of America as represented by the Secretary of the Navy
Filed Mar. 10, 1967, Ser. No. 623,187
1 Claim. (Cl. 340—4)

ABSTRACT OF THE DISCLOSURE

This invention is directed to an arrangement for detecting surfaced or submerged vehicles which involves comparing the wave form of geomagnetic micropulsations received at two detecting locations within the area under surveillance to determine whether these wave forms have been modified in any manner by the presence of such a vehicle.

---

Figure 1:
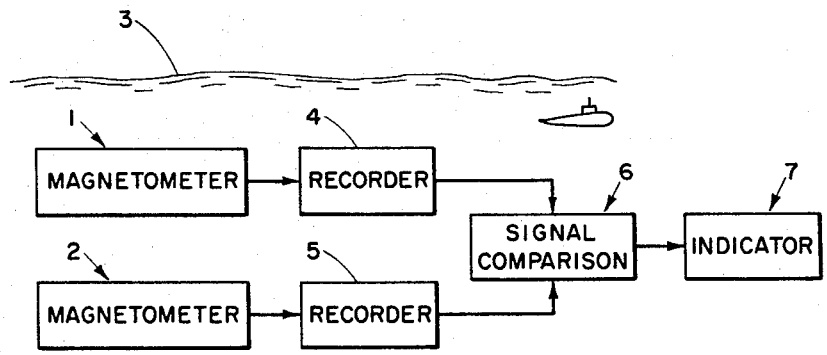

The invention described herein may be manufactured and used by or for the Government of the United States of America for governmental purposes without the payment of any royalties thereon or therefor.

The present invention relates generally to object detecting and locating systems and, more particularly, to an arrangement for locating surfaced or submerged marine vehicles which involves comparing the wave forms of geomagnetic micropulsations detected at at least a pair of sites within the surveillance area.

Conventional methods for detecting submerged vehicles may be classified as active or passive systems. In the active systems, the best example of which is, perhaps, the sonar system, sound energy is periodically radiated into the fluid medium by a transducer which subsequently operates in a receiving mode to detect echoes reflected from submerged targets within the propagating path. These echo ranging systems have well-known limitations, such as the transmission loss which increases as a function of the frequency of the propagated energy and the transmission irregularities caused by temperature and other physical changes normally occurring within the fluid medium.

In passive systems the apparatus detects disturbances in the environment caused by the presence therein of the submerged vehicle. Passive systems may employ, for example, infrared sensors to scan areas of the sea surface to identify temperature discontinuities or magnetometers to identify disturbances or distortions in the earth's magnetic field.

Geomagnetic micropulsations may be observed at all portions of the earth by means of telluric probes, crossed loops, atomic and molecular magnetometers and other well-known devices. These micropulsations are rapid fluctuations in the earth's magnetic field. They are naturally occurring and are thought to be caused, in some instances, by the interaction of protons in the "solar wind" with the earth's magnetic field. Their frequency range may be from 0.001 to 1 cycle per second, while their amplitude may range from several gammas to several thousand gammas, one gamma being equal to $10^{-5}$ gauss.

The present invention determines the presence of surfaced or submerged objects by utilizing these geomagnetic micropulsations in a manner somewhat analogous to the search pulses radiated by sonar transmitters in active systems. More particularly, the present invention compares the wave forms of geomagnetic micropulsations detected at two spaced points within or adjacent to the area under surveillance and determines whether these wave forms have been affected by a conducting or permeable mass in their vicinity. Although micropulsation activity varies with the time of day, the latitude and the local geological structure, the present invention makes use of the fact that certain segments of a micropulsation record have distinguishing characteristics and these distinct characteristics may be compared at two detecting sites to determine whether or not they have been modified in any dissimilar manner by the presence of a disturbing object which might act, for example, as a signal scatterer or reflector.

In one preferred embodiment of the invention, two magnetometers are located on a line normal to a seashore boundary. Each magnetometer is of the rubidium vapor type having a flat frequency response and essentially zero phase shift from one cycle per second to DC. One instrument is located at a first distance from the shoreline, while the other is located at twice this distance or beyond. Geomagnetic micropulsations, when they appear, are observed at both magnetometers. Certain segments of the micropulsation record produced at each site which signify "events" normally will show a high degree of correlation when examined and compared since these "events" usually have an extraterrestrial origin. However, if a conducting object or a permeable mass appears in the vicinity of these magnetometers, this correlation is degraded. The micropulsations may have their amplitude or phase changed, and this change will be more pronounced at that magnetometer of the pair which is nearer the disturbing object.

It will be recognized, of course, that when a relatively large, permeable mass, such as a submarine, approaches either one or both of the magnetometers these instruments will show a great change in the magnitude of the static magnetic field. This gross change, unlike those mentioned above, will be in the order of, for example, 40,000 gammas, and consequently, it may be disregarded by employing a signal comparison process which considers only the relatively rapid fluctuations in the output of each magnetometer.

Since the geomagnetic micropulsations are of extremely long wavelength and low frequency, they are little affected by seawater and can, therefore, penetrate the ocean to relatively great depths and be scattered or otherwise influenced by objects operating at these depths. For example, a micropulsation of one cycle per second may propagate with little change in amplitude down to a depth of 1,000 feet below the ocean surface. Thus, the present invention which utilizes these micropulsations as signals may be used to locate and track a deeply submerged vessel which normally could not be observed by conventional magnetometers positioned near the surface and monitoring only relatively slow changes in the earth's static magnetic field.

It is accordingly a primary object of the present invention to provide a method for detecting submerged vehicles which utilizes naturally occurring geomagnetic micropulsations as the signal means.

Another object of the present invention is to provide an arrangement for detecting submerged vessels which employs magnetometers that respond to geomagnetic micropulsations.

Figure 2:
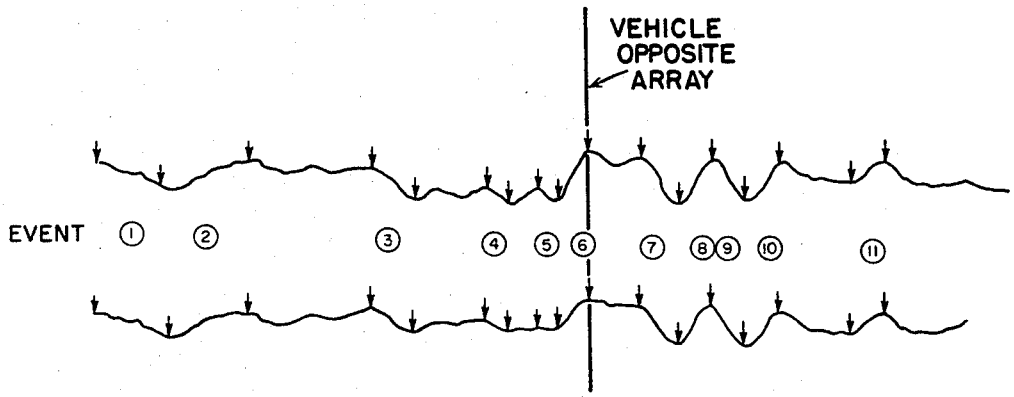

Other objects, advantages and novel features of the invention will become apparent from the following detailed description of the invention when considered in conjunction with the accompanying drawings wherein:

FIG. 1 schematically depicts one simplified arrangement for practicing the present invention; and FIG. 2 shows two geomagnetic micropulsation trains detected by the magnetometers of FIG. 1 as a vessel passed by these instruments.

Referring now to FIG. 1 which schematically illustrates one arrangement for detecting a submerged vessel, it will be seen that the system includes a pair of magnetometers 1 and 2 which may be optically pumped, rubidium vapor instruments positioned at different distances from a water course 3. Each magnetometer senses the same component of the earth's magnetic field, i.e., the $H_x$, $H_y$ or $H_z$ component. The output of these magnetometers is fed to recorders 4 and 5 which may provide both a graphic indication of the wave form of this signal and a magnetic recording of this signal for subsequent analysis and processing. From recorders 4 and 5 the signals pass to a signal comparison network 6 which may compare either the amplitude, phase or wave form of the two signals. For example, network 6 may carry out a cross-correlation analysis of the wave forms to determine whether these wave forms have been appreciably modified or altered as a result of any conducting body or permeable mass appearing in the water course 3. A suitable indicator 7 may be associated with signal comparison circuit 6 to indicate when the disparity between both signals reaches a given amount.

Another effective way of determining the extent of correspondence between the wave forms at both magnetometers is to utilize the zero axis crossing time of each wave form to generate a short microsecond pulse and then apply these pulse trains to a coincident circuit. The output signal of this circuit would be indicative of the amount of correlation between the geomagnetic micropulsation wave forms.

In the system of FIG. 1 the rubidium vapor magnetometers 1 and 2 are operated simultaneously, and the radio frequency signals produced by these detectors are heterodyned to a suitable, lower frequency level before being fed to recorders 4 and 5 which may be analog devices. A gradiometer signal may be obtained from the difference in the total field signals available at the output of these magnetometers, and this differential signal may also be employed to assist in determining whether or not a disturbing object appears in the vicinity of the two detectors.

In FIG. 2 there is shown reproductions of two micropulsation records from two magnetometers located adjacent to a ship channel. The near sensor was 700 feet from this channel, the far sensor, 2000 feet away. The line of these magnetometers was orthogonal to the channel, and each sensor was also aligned to be individually orthogonal to this channel.

A number of micropulsation excursions are identified as "events" on each of these records, with each event being delineated by pairs of arrowheads and numbered from "1" to "11." The amplitudes of each event is also noted. When a vehicle passed the detecting array, a noticeable increase in amplitude of micropulsation signals occurred at the near magnetometer relative to the far magnetometer. The vertical line through both traces corresponds to the approximate time the vehicle passed the sensor line. The results are set forth in the following table:

| Event Number | Near Sensor | Far Sensor | Gradient (Difference) |
|---|---|---|---|
| 1 | 12.5 | 11.0 | 1.5 |
| 2 | 14.0 | 11.0 | 3.0 |
| 3 | 13.5 | 11.0 | 2.5 |
| 4 | 7.5 | 6.5 | 1.0 |
| 5 | 6.0 | 2.5 | 3.5 |
| 6 | 22.0 | 13.5 | 8.5 |
| 7 | 20.5 | 16.0 | 4.5 |
| 8 | 19.0 | 18.0 | 1.0 |
| 9 | 19.0 | 19.0 | 0 |
| 10 | 17.0 | 16.0 | 1.0 |
| 11 | 10.0 | 10.0 | 0 |

It can be seen from this table that the amplitude of the differential response was far greater than that which would normally be expected from two instruments separated by the distance noted above. This difference may be attributed to the combined effects of the vehicle and the conducting properties of the channel within which it moved.

The frequency of the signal selected for analysis was in the 0.25 to 0.35 cycle per second range, and the output of each magnetometer was integrated over an appropriate period of time to minimize the effects of noise and other random disturbances.

As mentioned above, although FIG. 2 indicates the presence of a disturbing mass in the vicinity of the magnetometers by revealing a disparity in the amplitude of the signals detected by both instruments, the phase of these signals may also be employed for this purpose. Thus, the signal comparison network 6 in FIG. 1 may carry out its function by indicating the phase difference between the event signals fed to it, and indicator 7 may indicate the extent of this phase mismatch.

It will be appreciated that while the magnetometers in the embodiment of FIG. 1 are arranged to maintain surveillance over a channel, these instruments may be located on different vessels or on stabilized ocean platforms to monitor an ocean expanse with no land mass present. With such a setup, a comparison of, for example, the amplitude of the magnetometer signals would be necessary to ascertain which of the detectors of the array is the one nearer the intruding object.

Obviously many modifications and variations of the present invention are possible in the light of the above teachings. It is therefore to be understood that within the scope of the appended claim the invention may be practiced otherwise than as specifically described.

What is claimed is:

1. In a method for maintaining surveillance over an ocean expanse in order to ascertain the presence therein of an intruding vessel, the steps of
   detecting the geomagnetic micropulsations appearing at spaced locations within or adjacent said ocean expanse;
   recording the wave forms of the detected geomagnetic micropulsations; and
   comparing the recorded wave forms to determine dissimilarities in those portions of the recording which correspond to "events," thereby to provide an indication of whether the signals representing these "events" have been affected by a vessel in the vicinity of said locations.

References Cited

UNITED STATES PATENTS

| | | | |
|---|---|---|---|
| 2,415,808 | 2/1947 | Buckley | 340—4 X |
| 2,436,394 | 2/1948 | Maltby et al. | 340—4 X |
| 2,549,845 | 4/1951 | Mouzon et al. | 340—4 |
| 3,058,053 | 10/1962 | Bloom | 324—.5 |

RICHARD A. FARLEY, *Primary Examiner.*